(12) United States Patent
Dehlinger et al.

(10) Patent No.: US 12,204,052 B2
(45) Date of Patent: Jan. 21, 2025

(54) PHASE NOISE AND METHODS OF CORRECTION IN MULTI-FREQUENCY MODE LIDAR

(71) Applicant: Sense Photonics, Inc., Durham, NC (US)

(72) Inventors: Dietrich Dehlinger, San Francisco, CA (US); Hod Finkelstein, Berkeley, CA (US); Neil Woodhouse, Sunnyvale, CA (US); Brent Fisher, Bethesda, MD (US)

(73) Assignee: Sense Photonics, Inc., Durham, NC (US)

( * ) Notice: Subject to any disclaimer, the term of this patent is extended or adjusted under 35 U.S.C. 154(b) by 1018 days.

(21) Appl. No.: 17/260,764

(22) PCT Filed: Jul. 23, 2019

(86) PCT No.: PCT/US2019/042999
§ 371 (c)(1),
(2) Date: Jan. 15, 2021

(87) PCT Pub. No.: WO2020/023489
PCT Pub. Date: Jan. 30, 2020

(65) Prior Publication Data
US 2021/0263137 A1 Aug. 26, 2021

Related U.S. Application Data

(60) Provisional application No. 62/702,539, filed on Jul. 24, 2018.

(51) Int. Cl.
| | |
|---|---|
| *G01S 7/4861* | (2020.01) |
| *G01S 7/484* | (2006.01) |
| *G01S 17/26* | (2020.01) |
| *G01S 17/894* | (2020.01) |

(52) U.S. Cl.
CPC ............ *G01S 7/4861* (2013.01); *G01S 7/484* (2013.01); *G01S 17/26* (2020.01); *G01S 17/894* (2020.01)

(58) Field of Classification Search
CPC .... G01S 7/4861; G01S 7/4913; G01S 7/4915; G01S 17/26; G01S 17/36; G01S 17/894
See application file for complete search history.

(56) References Cited

U.S. PATENT DOCUMENTS

| | | | |
|---|---|---|---|
| 7,791,715 B1 * | 9/2010 | Bamji | G01C 3/08 356/5.1 |
| 2011/0188028 A1 | 8/2011 | Hui et al. | |

(Continued)

FOREIGN PATENT DOCUMENTS

WO 2018037728 A1 3/2018

OTHER PUBLICATIONS

Notification of Transmittal of the International Search Report and the Written Opinion of the International Searching Authority, or the Declaration, in corresponding PCT Application No. PCT/US2019/042999 (Date: Nov. 8, 2019).

(Continued)

*Primary Examiner* — Eric L Bolda
(74) *Attorney, Agent, or Firm* — Kilpatrick Townsend & Stockton LLP (57) ABSTRACT

A LIDAR apparatus includes an emitter array having a plurality of emitter pixels configured to emit optical signals, a detector array having a plurality of detector pixels configured to output detection signals responsive to light incident thereon, and a circuit that is coupled to the detector array. The circuit is configured to perform operations including receiving the detection signals output from the detector array, where each of the detection signals includes component measurements defining a respective phase vector, gen- (Continued)

erating a combined vector based on the component measurements of a plurality of the detection signals, and identifying a distance range of a target from which the optical signals were reflected based on an angle of the combined vector. Related devices and methods of operation are also discussed.

20 Claims, 7 Drawing Sheets

(56) References Cited

U.S. PATENT DOCUMENTS

| | | |
|---|---|---|
| 2012/0146846 A1 | 6/2012 | Antonik et al. |
| 2014/0340569 A1* | 11/2014 | Raskar .................. G01S 17/894 348/370 |
| 2015/0131080 A1 | 5/2015 | Retterath et al. |
| 2015/0276394 A1 | 10/2015 | Durandin et al. |
| 2016/0116594 A1 | 4/2016 | Xu et al. |
| 2017/0205497 A1* | 7/2017 | Dorrington ........... G01S 17/894 |
| 2017/0257617 A1 | 9/2017 | Retterath |
| 2018/0011195 A1 | 1/2018 | Perry et al. |
| 2018/0259616 A1 | 9/2018 | Jo |
| 2018/0301872 A1 | 10/2018 | Burroughs et al. |
| 2021/0231805 A1* | 7/2021 | Dehlinger ............. G01S 7/4863 |

OTHER PUBLICATIONS

Extended European Search Report corresponding to European Application No. 19841380.9 (8 pages) (Feb. 2, 2022).
Application No. EP19841380.9, Office Action, Mailed On Sep. 16, 2024, 5 pages.

* cited by examiner

PHASE NOISE AND METHODS OF CORRECTION IN MULTI-FREQUENCY MODE LIDAR

CLAIM OF PRIORITY

This application is a 35 U.S.C. 371 national stage application of PCT International Application No. PCT/US2019/042999, filed on Jul. 23, 2019, which claims the benefit of priority from U.S. Provisional Patent Application No. 62/702,539, filed Jul. 24, 2018, in the United States Patent and Trademark Office, the disclosures of which are incorporated by reference herein in their entireties.

FIELD

The present disclosure is directed systems for three-dimensional (3D) imaging, and more particularly, to methods and devices to reduce noise in indirect time-of-flight Light Detection And Ranging systems.

BACKGROUND

Time of flight (ToF) based imaging is used in a number of applications including range finding, depth profiling, and 3D imaging (e.g., Light Detection And Ranging (LIDAR), also referred to herein as lidar). ToF 3D imaging systems can be categorized as indirect ToF (iToF) or direct ToF systems.

Direct ToF measurement includes directly measuring the length of time between emitting radiation by an emitter element of a LIDAR system, and sensing or detecting the radiation after reflection from an object or other target (also referred to herein as an echo signal) by a detector element of the LIDAR system. From this length of time, the distance to the target can be determined.

Indirect ToF measurement includes modulating the amplitude of the emitted signal and measuring the phase delay or phase shift (more generally referred to herein as the phase) of the echo signal, where the time required for the signal to travel to and from an object results in a phase shift that is proportional to the distance traveled. More particularly, the distance range d to a target can be calculated from the detected phase shift of the returning echo signal as:

$$d = \frac{ct}{2} = \frac{\varphi}{2\pi} \frac{c}{2fm}$$

where c is the speed of light, t is the time required for a photon to travel to the target and back to the detector, $\varphi$ is the phase shift of the modulated signal, and $f_m$ is the modulation frequency. Since the maximum phase shift that can be measured is $2\pi$, the unambiguous range (UR) for the modulation frequency $f_m$ may be expressed as $UR=c/2f_m$.

The unambiguous range may refer to the range beyond which the phase to distance mapping rolls-over or "wraps around" for an iToF system, such that targets beyond the unambiguous range may be reported as being located at a shorter range than their real or actual range ($d_{real}$), where the range reported $d_{reported}=d_{real}$ mod ($2\pi$). For example, due to the repeated pulsed nature of the light, an unambiguous range of 10 meters (m) may return a 2 m range measurement for a 12 m object. Multi-frequency techniques (using light emission at different modulation frequencies) may be used to resolve phase wrap around, such that a matching reported range $d_{reported}$ for two or more different modulation frequencies may identify the actual range.

SUMMARY

Some embodiments described herein provide methods, systems, and devices including electronic circuits that provide a LIDAR system including one or more emitter elements (including semiconductor lasers, such as surface- or edge-emitting laser diodes; generally referred to herein as emitters) and/or one or more light detector elements (including semiconductor photodetectors, such as photodiodes, including avalanche photodiodes and single-photon avalanche detectors (SPADs); generally referred to herein as detectors).

According to some embodiments of the present disclosure, a flash LIDAR apparatus includes an emitter array having a plurality of emitter pixels configured to emit optical signals and arranged to direct the optical signals over subregions of a field of view; a detector array having a plurality of detector pixels configured to output detection signals responsive to light incident thereon; and a circuit that is coupled to the detector array. The circuit is configured to perform operations including receiving the detection signals output from the detector array, each of the detection signals including component measurements defining a respective phase vector or otherwise representing phase data; generating a combined vector based on the component measurements of a plurality of the detection signals; and identifying a distance range of a target from which the optical signals were reflected based on an angle of the combined vector.

In some embodiments, the component measurements of each of the detection signals may define a respective phase vector, and the combined vector may represent an average of the phase data of the plurality of the detection signals based on a combination of the respective phase vectors. For example, the circuit may be configured to average the phase data of the plurality of the detection signals by computing the respective phase vectors from the component measurements for each of the plurality of detection signals, and adding the respective phase vectors to generate the combined vector.

In some embodiments, the component measurements of each of the detection signals may include first and second components defining a respective phase vector, and the combined vector may be based on a sum of the first components and a sum of the second components of the respective phase vectors.

In some embodiments, the component measurements of each of the detection signals are sampled at respective phase offsets corresponding to respective subframes of a measurement frame of operation of the detector array. In some embodiments, the respective phase offsets may be separated by 90 degrees.

In some embodiments, the first components may be horizontal components (e.g., the 0° and 180° components) and the second components may include vertical components (e.g., the 90° and 270° components) for the measurement frequency. The circuit may be configured to determine the angle of the combined vector by performing an arctangent operation based on the sum of the vertical components and the sum of the horizontal components of the respective phase vectors.

In some embodiments, the plurality of the detection signals may be output from a plurality of the detector pixels of the detector array during the same measurement frame.

In some embodiments, the plurality of the detection signals may be sequentially output from one of the detector pixels of the detector array during consecutive measurement frames.

In some embodiments, the circuit may be configured to perform operations to differently scale or weight the detection signals based on respective intensities thereof prior to generating the combined vector. For example, the operations to differently scale or weight the detection signals may include more heavily weighting dimmer intensities of the respective intensities. In some embodiments, the respective intensities of the detection signals may differ based on respective spatial positions of the detector pixels in the detector array.

In some embodiments, the circuit may be configured to perform operations to apply respective phase corrections (e.g., as phase offsets) to the phase data represented by the component measurements prior to generating the combined vector. For example, the operations to apply the respective phase corrections may include determining respective phase angles represented by the component measurements; applying the respective phase corrections to the respective phase angles to provide respective corrected phase angles; and converting the respective corrected phase angles into the respective phase vectors comprising the horizontal and vertical components.

In some embodiments, the detection signals may be first detection signals having a first frequency, the combined vector may be a first combined vector, and the angle may be a first angle. The circuit may be configured to perform further operations including receiving second detection signals output from the detector array, each of the second detection signals having a second frequency and including component measurements defining a respective phase vector or otherwise representing phase data; and generating a second combined vector based on the component measurements of the second detection signals. The operations for identifying the distance range of the target from which the optical signals were reflected may be based on a correspondence of the first angle of the first combined vector and a second angle of the second combined vector.

In some embodiments, the correspondence of the first and second angles may be indicated by a lookup table that correlates respective phase shift pairs (e.g., 0, π/2, π, 3π/2) to respective sub-ranges of an unambiguous range for the first and second frequencies. The first and second angles may correspond to one of the respective phase shift pairs, and the distance range of the target may correspond to one of the respective sub-ranges.

In some embodiments, the correspondence may be a match between a first set of distance estimates or reported ranges indicated by the first angle and a second set of distance estimates or reported ranges indicated by the second angle.

In some embodiments, the circuit may be configured to operate the emitter array to vary the first and second frequencies of the optical signals.

In some embodiments, the circuit may be configured to increase a quantity of the detection signals being averaged responsive to differences in intensities thereof.

In some embodiments, the LIDAR apparatus may be configured to be coupled to a vehicle such that the emitter and detector arrays are oriented relative to an intended direction of travel of the vehicle.

In some embodiments, the circuit may be integrated in a same chip or package with the detector array. In some embodiments, the detector pixels may include one or more single-photon detectors, such as SPADs.

According to further embodiments of the present disclosure, method of operating a LIDAR apparatus includes performing, by circuit of the LIDAR apparatus, operations including receiving detection signals output from a detector array responsive to optical signals incident thereon, each of the detection signals including component measurements defining a respective phase vector or otherwise representing phase data; generating a combined vector based on the component measurements of a plurality of the detection signals; and identifying a distance range of a target from which the optical signals were reflected based on an angle of the combined vector.

According to still further embodiments of the present disclosure, method of operating a LIDAR apparatus includes operations performed by at least one processor. The operations include providing emitter control signals to an emitter array having emitter pixels that are configured to emit optical signals at two or more modulation frequencies over subregions of a field of view responsive to the emitter control signals; providing detector control signals to a detector array having detector pixels that are configured to detect light incident thereon responsive to the detector control signals; receiving detection signals output from the detector array responsive to the light incident thereon, where the detection signals include component measurements sampled at respective phase offsets; for each of the two or more modulation frequencies, generating a respective combined phase vector comprising a sum of the component measurements of a plurality of the detection signals; determining respective angles of the respective combined phase vectors; and identifying a distance of a target from which the respective optical signals were reflected based on the respective angles of the respective combined phase vectors.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION

Some iToF LIDAR systems operate by transmitting (from one or more emitters defining an emitter pixel), receiving (at one or more detectors defining a detector pixel), and measuring (at one or more processors or control circuits) the phase of optical signals at multiple different modulation frequencies (also referred to herein as measurement frequencies). For example, the emitter pixels of a LIDAR system may emit a continuous modulated sinusoidal or square wave light signal at each of the multiple frequencies, and the phases of the echo signals received at the detector pixels may be measured by the control circuit. For each measurement frequency, the phase may be related to the distance range of an object contained in or imaged by the pixel, though they may change at different rates. As the associated wavelengths of the measurement frequencies are typically shorter than the read range or imaging range, the combination of two phases (one at each measurement frequency) can be used to uniquely identify the distance. That is, distance may be determined by analyzing respective signals at multiple (e.g., two) separate or distinct modulation frequencies, such that the true or actual location of the target may be indicated where the measurements at the different modulation frequencies agree or match. The phase of the returning light signal (after reflection by a target in the field of view) may be converted to distance using a lookup table and/or using quadrature sampling techniques.

Various forms of noise may result in unique error modes, one of which is referred to as integer ambiguity. Integer ambiguity may cause repeated measurements of the same object to fall into a number of discretely spaced distance range distributions. The width of each sub distribution is typically less than the distance between the groups of the discretely spaced distributions. In some instances, this effect may dominate the noise measurements once it appears.

Figure 6A:
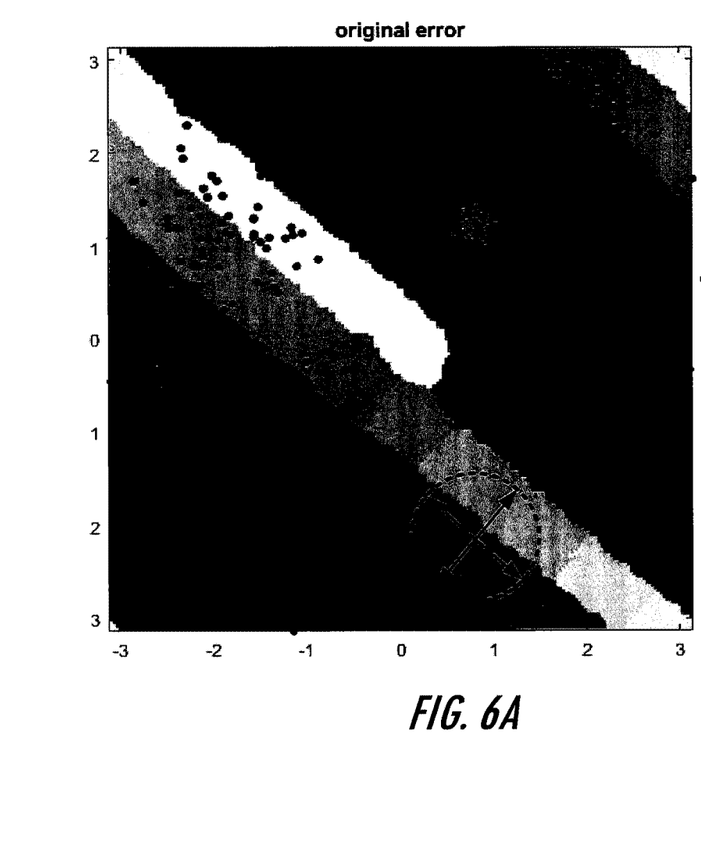
FIGS. 6A and 6B are lookup tables illustrating distance range estimation performed without and with operations for averaging of data in phase space in accordance with embodiments of the present disclosure, respectively.

As noted, above a matching reported range for two or more different modulation frequencies may indicate the actual range. Without noise, a relatively small number of valid combinations may be expected. However, noise can redistribute (or "pull") measured data into different distance sub-ranges, which may be referred to herein as "wiggle." FIG. 6A illustrates a lookup table that maps distance subranges in phase space to phase combinations for two modulation frequencies. The different shadings in FIG. 6A represent distance domains corresponding to respective distance sub-ranges. The effects of wiggle may reduce the spacings of the distance domains that correspond to valid phase combinations.

Noise on the phase measurements may thus have effects on distance range calculation, including broadening the area in phase space into which the measured data points may fall. As shown in FIG. 6A, ambiguity as to the actual range may arise from the data points spanning from one distance domain to another, which may not be correctable by calibration. Distance standard deviation and integer ambiguity may be considered aspects of the same noise, as both may stem from measurement noise in phase space. In FIG. 6A, data points distributed in the direction of the dotted doublearrows (extending along the distance domains) may indicate distance noise, and data points distributed in the direction of the solid double-arrows (perpendicular to the distance domains) may indicate integer ambiguity.

There may be a tradeoff between system spatial resolution and integer ambiguity. For example, phase measurements taken from optical signals modulated at two higher frequencies (e.g., 18 MHz and 21 MHz) may provide finer resolution over an unambiguous range corresponding to the greatest common divisor of the two frequencies than that which can be achieved by optical signals modulated at a single lower frequency (e.g., 3 MHz) for the same unambiguous range. However, such finer resolution may require more unique use of the phase space, which may increase the likelihood of a fixed amount of noise causing ambiguous determinations with respect to range. The standard deviation of the estimated distance ranges may differ for the same amount of noise when computed using different modulation frequency pairs. The modulation frequencies may be varied, tuned, or otherwise selected to reduce integer ambiguity, but at the cost of resolution.

There may be several methods to reduce effects of noise on distance range calculation (also referred to herein as distance noise) in addition to selection of different modulation frequency pairs. For example, the detectors may be controlled to collect more photons over longer integration times or durations. However, this may result in higher error (due to data points being spread over a wider range of integer ambiguity values) unless accompanied by additional data processing. Also, the longer integration times may render the collected data more prone to motion artifacts.

As another example, measured data points may be discarded based on various criteria (e.g., intensity or variability). In particular, clusters of ranges may be used to identify the data points corresponding to the correct distribution, and the remaining data points may be discarded. However, this may likewise be computationally expensive, may require collecting and discarding large amounts of data, and may be less reliable (e.g., if the distribution containing the actual range becomes too empty or ambiguous).

Also, the computed distance range data over a region of interest (ROI) may be averaged together to provide a lower standard deviation between measurements. However, such distance range averaging may average data that is erroneous, and thus may become more error-prone once integer ambiguity issues arise. For example, the distribution may become unevenly multimodal, causing averages to deviate from the actual range (regardless of the number of points). Also, portions of the distribution may eventually reset to zero at the end of the maximum range, which can falsely pull down the average.

Some embodiments of the present disclosure may arise from recognition that averaging based on measurements in phase space (rather than averaging based on calculated distance ranges) may be a less complex and more powerful method to reduce effects of noise in distance range calculation in indirect ToF LIDAR systems. In particular, rather than linearly averaging calculated distance range data, which may be discontinuous and circular, embodiments described herein are directed to operations for circularly averaging the continuous underlying phase data for respective subframes, to arrive at a more correct phase than may be achieved by the above and/or other methods. Advantages of such embodiments may include, but are not limited to, reduced discarding of data (e.g., keeping and using more or all of the collected data), reduced overall data collection requirements, reduced standard deviation from averaging adjacent points, and reduced integer ambiguity by bringing the average phases closer to the correct phase.

A LIDAR system may include an array of emitter elements and an array of detector elements, or a system having a single emitter element and an array of detector elements, or a system having an array of emitters and a single detector element. A flash LIDAR system may acquire images by emitting light from an array of emitter elements for short durations (pulses) over a field of view (FOV) and detecting the reflected light emission. Subregions of the array of emitter elements are arranged to direct light to (and subregions of the array of detector elements are arranged to receive light from) respective subregions within the FOV, which are also referred to herein as regions of interest (ROI). A non-flash or scanning LIDAR system may generate image frames by raster scanning light emission (continuously) over a field of view, for example, using a point scan or line scan to emit the necessary power per point and sequentially scan to reconstruct the full FOV from detection of the reflected light emission. Embodiments described herein are directed to data processing operations based on averaging of phase data (rather than calculated distance range data) that is received from detectors arranged to cover a ROI, also referred to herein as ROI averaging of phase data, for flash or non-flash/scanning LIDAR applications.

Figure 1:
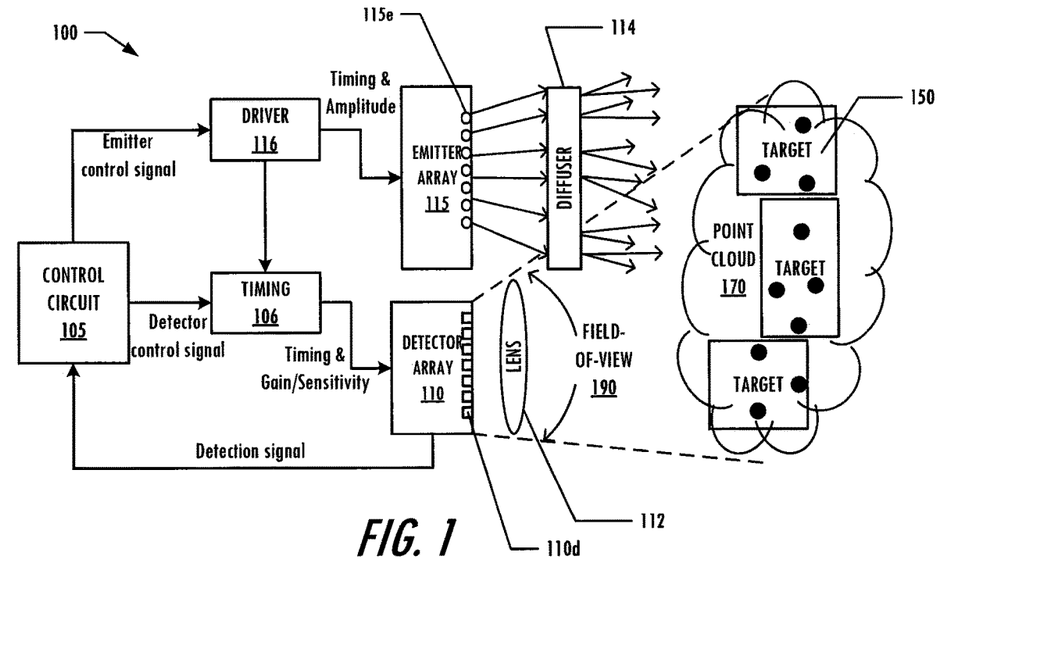
FIG. 1 is a block diagram illustrating a flash LIDAR system or circuit that is configured to perform averaging of data in phase space in accordance with embodiments of the present disclosure.

An example of a flash LIDAR system or circuit 100 that is configured to perform averaging of data in phase space in accordance with embodiments of the present disclosure is shown in FIG. 1. The system 100 includes a control circuit 105, a timing circuit 106, an emitter array 115 including a plurality of emitters 115e, and a detector array 110 including a plurality of detectors 110d (for example, an array of single-photon detectors). One or more of the emitter elements 115e of the emitter array 115 may define emitter pixels that respectively emit a radiation pulse or continuous wave signal (for example, through a diffuser or optical filter 114) at a time and frequency controlled by a timing generator or driver circuit 116. In particular embodiments, the emitters 115e may be pulsed light sources, such as LEDs or lasers (such as vertical cavity surface emitting lasers (VCSELs)). Radiation is reflected back from a target 150, and is sensed by detector pixels defined by one or more detector elements 110d of the detector array 110. The control circuit 105 implements a pixel processor that measures the time of flight of the illumination pulse over the journey from emitter array 115 to target 150 and back to detector array 110, using direct or indirect ToF measurement techniques.

In particular embodiments, the detectors 110d may be single photon detectors, such as single photon avalanche detectors (SPADs). In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the modulation frequency, timing and amplitude of the optical emission signals that are output from the emitters 115e. The emission of optical signals from multiple emitters 115e provides a single image frame for the flash LIDAR system 100. The maximum optical power output of the emitters 115e may be selected to generate a signal-to-noise ratio of the echo signal from the farthest, least reflective target at the brightest background illumination conditions that can be detected in accordance with embodiments described herein. A diffuser 114 is illustrated to increase a field of view of the emitter array 115 by way of example.

Light emission output from one or more of the emitters 115e impinges on and is reflected by one or more targets 150, and the reflected light is detected as an optical signal (also referred to herein as an echo signal or echo) by one or more of the detectors 110d (e.g., via one or more lenses 112), converted into an electrical signal representation (referred to herein as a detection signal), and processed (e.g., based on time of flight) to define a 3-D point cloud representation 170 of the field of view 190. Operations of LIDAR systems in accordance with embodiments of the present disclosure as described herein may be performed by one or more processors or controllers, such as the control circuit 105 of FIG. 1.

Figure 2:
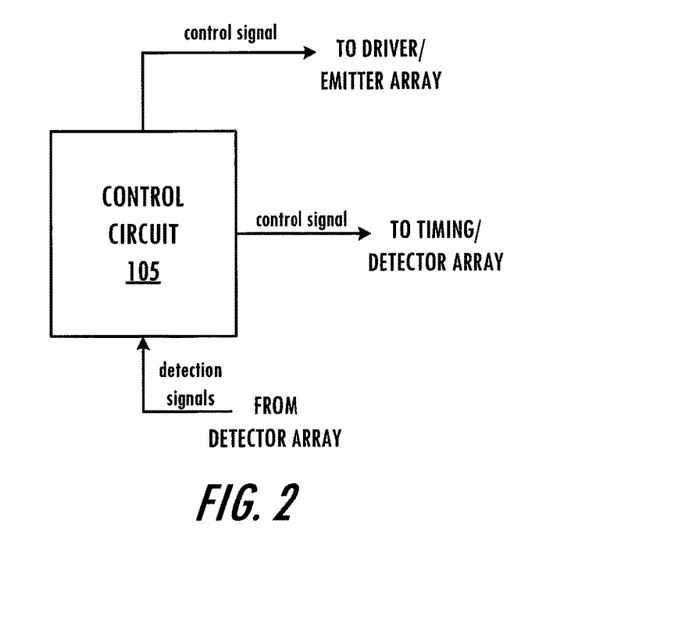
FIG. 2 is a block diagram illustrating the control circuit of FIG. 1 in greater detail.

FIG. 2 illustrates the control circuit 105 of FIG. 1 in greater detail. In some embodiments, the control circuit 105 may include a pixel processor that outputs emitter control signals and detector control signals to the emitter array 115 and detector array 110 to control the emission of the optical signals and the detection of the reflective optical signals, respectively. The control circuit 105 calculates the distance to the target 150 by measuring the phase delay or phase shift of an illumination pulse over the journey from the emitter array 115 to a target 150 and back to the detector array 110 (i.e., the difference in phase between the optical signal emitted by the emitter array 115 and the reflected optical signal or echo received at the detector array 110, as indicated by the respective detection signals output from the detector array 110). Portions or an entirety of the control circuits described herein may be integrated in the emitter array 115 and/or detector array 110 in some embodiments. Although illustrated with reference to a flash LIDAR system, it will be understood that embodiments described herein may include non-flash or scanning (also referred to as "line scanning" or "point scanning" without loss of generality to other types of scanning) LIDAR systems as well.

In some embodiments, for each of the modulation or measurement frequencies of the optical signals output by the emitter array 115, the control circuit 105 may perform a phase measurement that is based on multiple component measurements (referred to herein with reference to four measurements, D0, D1, D2, and D3) indicative of the different phases of the detection signals output from the detector array 110. The respective component measurements D0, D1, D2, and D3 may be samples of the returning echo signals that are taken at respective phase offsets (e.g., at 0°, 90°, 180°, and 270° phase delays) with respect to a chip reference signal for the detector array 110. It will be understood that the description herein with reference to four measurements, D0, D1, D2, and D3 with phase offsets of 0°, 90°, 180°, and 270° is by way of example only, and that embodiments of the present disclosure may utilize fewer or more component measurements for distance range calculation. For example, in some embodiments, only a subset of the four measurements (e.g., only the 0° and 90° components) may be sampled or otherwise utilized.

More particularly, each of the detector elements 110d of the detector array 110 is connected to a timing circuit 106. The timing circuit 106 may be phase-locked to the driver circuitry 116 of the emitter array 115. The timing of operation and sensitivity of each of the detector elements 110d or of groups of detector elements 110d may be controlled by the timing circuit 106. The timing circuit 106 may operate respective pixels (including one or more detector elements 110d) of the detector array 110 to sample the echo signals at respective phase offsets (e.g., 90°, 180°, 270°) corresponding to the respective measurement subframes. As such, each of the detection signals output from the detector array 110 may include multiple component measurements D0, D1, D2, D3 sampled at phase offsets 0°, 90°, 180°, 270°, respectively.

In some embodiments, a detector element 110d of a detector array 110 may include first and second accumulator wells, with each well being activated by the control circuit 105 or associated timing circuit 106 to detect incident photons for respective portions of each measurement subframe. Each measurement subframe may be delayed or "shifted" by a fraction of the period defined by the respective measurement frequency $f_m$ (where the period=$1/f_m$). Each subframe may thus be a measurement of a phase component that is 0, 90, 180, or 270 degrees out of phase (or offset) with respect to a reference optical signal pulse or other reference signal, with operation of the detector(s) being shifted by one-quarter of the period corresponding to the measurement frequency for each of the four subframes.

For instance, for an optical signal emitted from the emitter array 115 at a modulation frequency of 20 MHz (and thus, a period of 50 nanoseconds (ns)), measurement of the 0° subframe may include activation of a first accumulator well of a detector 110d for time range of 0 ns to 25 ns (e.g., half of the 50 ns period), and activation of a second accumulator well of the detector 110d for time range 25 ns to 50 ns (e.g., the other half of the 50 ns period). The timing of activation of the first and second accumulator wells may each be likewise shifted or offset by 12.5 ns (e.g., one-quarter of the 50 ns period) for measurement of each subsequent subframe (e.g., 90°, 180°, 270°) of a measurement frame. For example LIDAR systems as described herein using two measurement frequencies, distance may be measured using eight subframes (i.e., four component measurements or subframes at each of the two measurement frequencies).

Figure 3A:
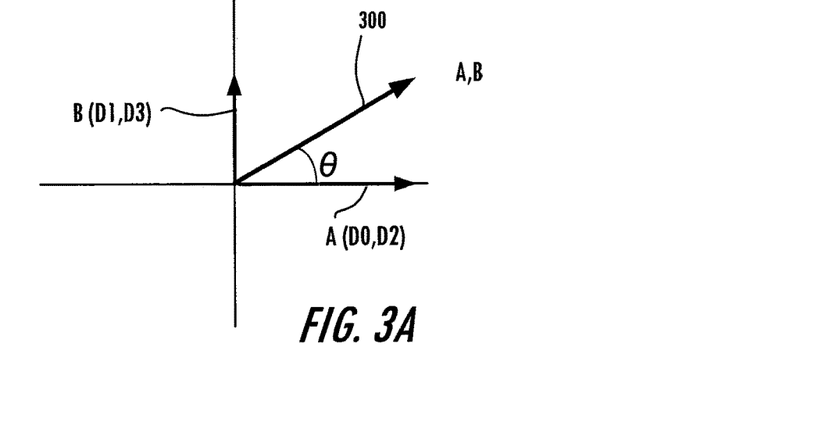
FIGS. 3A, 3B, and 3C are diagrams illustrating operations for averaging of data in phase space in accordance with embodiments of the present disclosure.
Figure 3B:
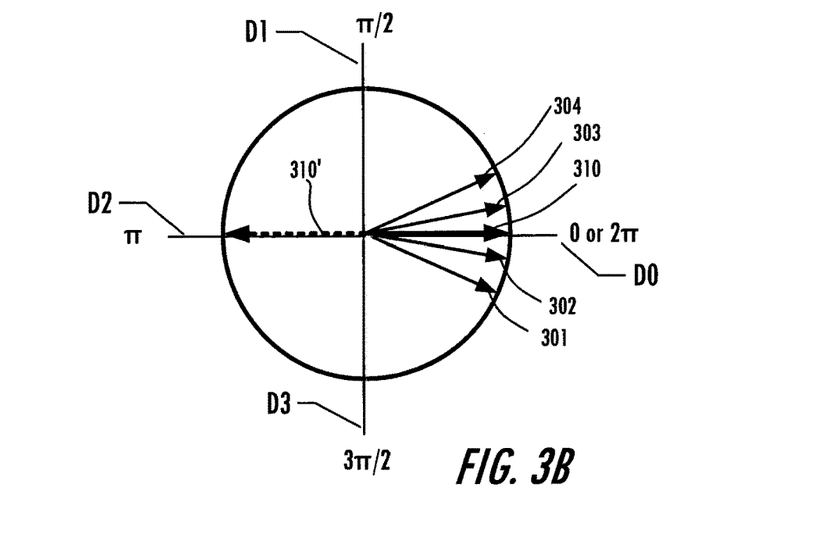
Figure 3C:
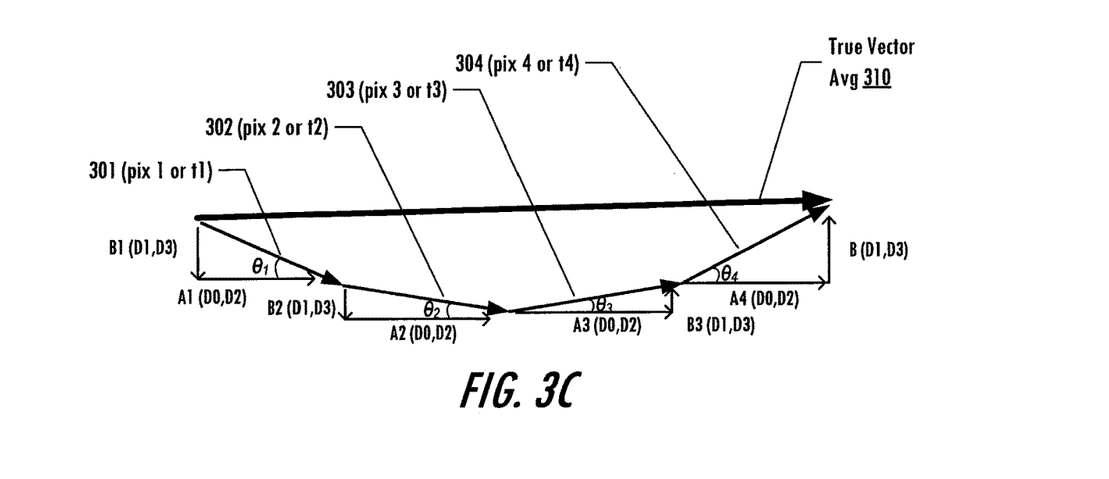
Figure 4:
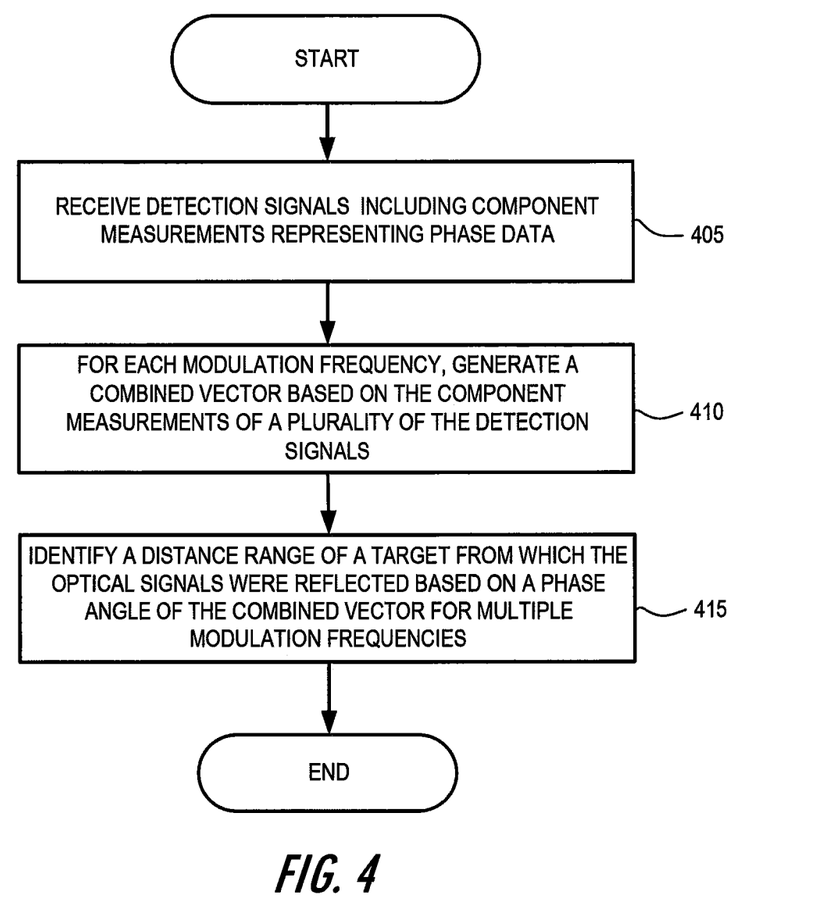
FIG. 4 is a flowchart illustrating operations for averaging of data in phase space in accordance with embodiments of the present disclosure.

FIGS. 3A, 3B, and 3C are diagrams and FIG. 4 is a flowchart illustrating operations that may be performed by a control circuit, such as the control circuit 105 of FIGS. 1 and 2, for averaging data in phase space in accordance with embodiments of the present disclosure. Circular averaging based on phase measurements can be used as described herein as a less complex and more powerful method to reduce range ambiguity and effects of noise thereon.

As noted above, a phase measurement for each measurement frequency may be taken by operating the detector array 110 so as to output detection signals including a series of separate component measurements, which may correspond to subframes of operation of the detectors 110d. Embodiments herein are described by way of example with reference to a detector measurement frame including four subframes D0, D1, D2, D3, with component measurements taken at 0, 90, 180, 270 degree phase delays, respectively, but the present invention is not limited to these examples. The signals measured in the D0) (0°) and D2 (180°) subframes are correlated, as are the signals measured in the D1 (90°) and D3 (270°) subframes. For example, for a static scene, the signals measured in the D0 (0°) and D2 (180°) subframes may be equal and opposite, and the signals measured in the D1 (90°) and D3 (270°) subframes may be equal and opposite.

Referring to FIG. 3A, the component measurements for each detection signal represent multiple (e.g., two orthogonal) vector components A, B defining a phase vector 300. In rectangular form, the data in the D0 (0°) and D2 (180°) subframes define horizontal (or X-) components of the vector 300, and can be combined (e.g., by vector addition) in a single data channel A. The data in the D1 (90°) and D3 (270°) subframes define vertical (or Y-) components of the vector 300, and can be likewise combined in a single data channel B. In other words, the first vector component A (e.g., from the 0° and 180° measurements) may represent a horizontal/X-component, and the second vector component B (e.g., from the 90° and 270° measurements) may represent a vertical/Y-component. The phase of a received detection signal for each measurement frequency may be the angle θ defined by the vector A, B represented by the component measurements. That is, the two pairs of component measurements (the 0°, 180° components and the 90°, 270° components) for a measurement frequency may be combined into horizontal and vertical components, respectively, of a phase vector 300 for that measurement frequency, with the angle θ formed by these components being the phase.

In some embodiments, operations for improving LIDAR-measured phase may recognize that, in phase space, noise may be a single distribution, with the width or standard deviation of the distribution being a function of the signal and background intensities. Such noise in phase space can be reduced or corrected by averaging together several data points, such as data from the same pixel across multiple frames (which may reduce time resolution), or data from multiple pixels in a single frame (which may reduce spatial resolution). While data can be averaged directly in phase space, problems or errors may arise where the data lies at the edge of the unambiguous range and the measured phase "rolls over" between 0 and $2\pi$ between different points.

Some embodiments of the present disclosure may resolve roll over-related errors by treating the phase indicated by each detection signal as a phase vector and adding the respective phase vectors (or A- and B-components thereof) of multiple detection signals of the same modulation frequency to generate a combined vector, such that the angle of the combined vector represents the average phase (e.g., a mean of circular quantities). Referring to FIGS. 3B, 3C, and 4, multiple detection signals including respective component measurements representing phase data are output by one or more detector pixels of the detector array 110 and are received by the control circuit 105 (block 405). The detection signals may be output from multiple pixels of the detector array 110 during a same measurement frame (spatial averaging), and/or from the same pixel of the detector array 110 in consecutive measurement frames (temporal averaging). The phase data may represent a phase shift of the detection signal, and may be represented by the separate component measurements in each detection signal. As shown in FIGS. 3B and 3C, each of the four illustrated detection signals include multiple component measurements that define respective phase vectors 301, 302, 303, and 304. The component measurements for each of the phase vectors 301-304 are sampled at phase offsets 0°, 90°, 180°, and 270° corresponding to subframes D0, D1, D2, D3, respectively.

Referring to FIGS. 3C and 4, the control circuit 105 generates a combined vector 310 based on a sum of the respective phase vectors 301, 302, 303, and 304 (block 410). FIG. 3C shows that the mean direction and resultant length of the combined vector 310 for the phase data represented by the vectors 301-304 can be visually represented by placing the vectors 301-304 head to tail, such that the combined vector 310 extends from the tail of the first vector 301 to the head of the last vector 304. More particularly, as shown in FIG. 3C, the phase vectors 301, 303, 303, and 304 include first (horizontal) components A1, A2, A3, and A4 and second (vertical) components B1, B2, B3, and B4, respectively. The horizontal components A1-A4 are each based on a combination of (e.g., a difference between) the D0 and D2 subframes of the vectors 301-304, and the vertical components B1-B4 are each based on a combination of (e.g., a difference between) the D1 and D3 subframes of the vectors 301-304. The control circuit 105 may generate the combined vector 310 based on a sum of the horizontal components A1, A2, A3, and A4, and as a sum of the vertical components B1, B2, B3, and B4.

The angle of the combined vector 310 (shown in the example of FIG. 3C as 0°) represents an average of the different phases of the phase vectors 301-304. The control circuit 105 may calculate the angle of the combined vector 310, for example, by computing the arctangent based on the sum of the horizontal components A1, A2, A3, and A4 and the sum of the vertical components B1, B2, B3, and B4 (representing the in-phase and quadrature components, respectively) of the phase vectors 301-304. In some embodiments, the control circuit 105 may use the a tan 2 function to calculate the average phase angle of the combined vector 310 based on sum of the horizontal components A1, A2, A3, and A4 and the sum of the vertical components B1, B2, B3, and B4, which results in the appropriate average phase without considering phase rollover or wraparound.

In contrast, referring again to FIG. 3B, a combined vector 310' based on a naïve numerical average of the phase data represented by the vectors 301-304 (rather than based on the vector sum of the vectors 301-304 themselves) may result in calculation of an erroneous average (shown in FIG. 3B as 180°). The vector sum represented by the combined vector 310 thus produces the correct average in a computationally efficient manner, reducing or avoiding issues with range integer ambiguities and phases transitioning between 0 and $2\pi$, with less computational complexity, thereby reducing processing requirements. Embodiments of the present disclosure may be advantageous in that the combined vector 310 can be determined by directly utilizing raw or unprocessed phase data in the form of the component measurements that are included in the detection signals output from the detector array 110 (e.g., by combining D0-D2 and D1-D3, for example, by vector addition or subtraction).

Figure 6B:
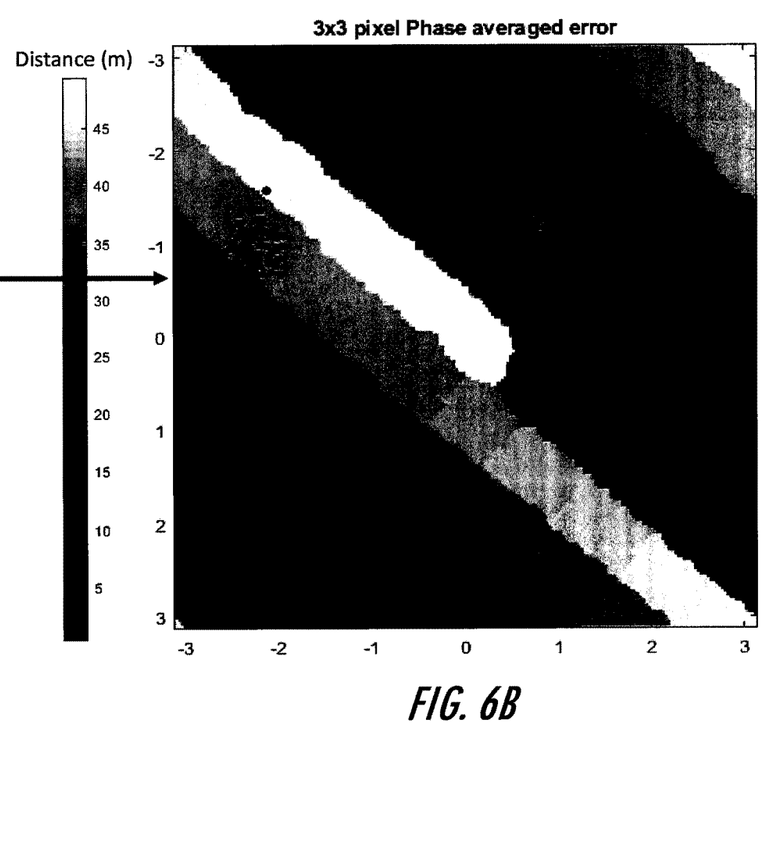

Still referring to FIG. 4, as a matching phase (or corresponding distance) between detection signals of two or more frequencies can be used to resolve phase wraparound, the control circuit 105 may identify a distance range of a target from which the optical signals were reflected based on the phase indicated by the angle of the combined vector 310 for at least two different modulation frequencies (at block 415). For example, detection signals of two different modulation frequencies may yield a first combined vector having a first angle, and a second combined vector having a second angle. Each of the first and second angles may be converted to a phase offset or phase shift (e.g., 0, $\pi/2$, $\pi$, $3\pi/2$), and the pair of phase offsets indicated by the first and second angles may be converted to a distance range, for example, using a lookup table that correlates respective phase shift pairs to respective sub-ranges of an unambiguous range for the two different modulation frequencies, as shown in FIGS. 6A-6B. That is, the operations of blocks 405 and 410 may be performed for each modulation frequency of the optical signals output by the emitter array 115, and the operations of block 415 may be performed based on a correspondence between angles of multiple combined vectors for multiple modulation frequencies. The identified distance range at block 415 may also be referred to herein as a distance estimate or estimated distance range of the target.

Figure 3D:
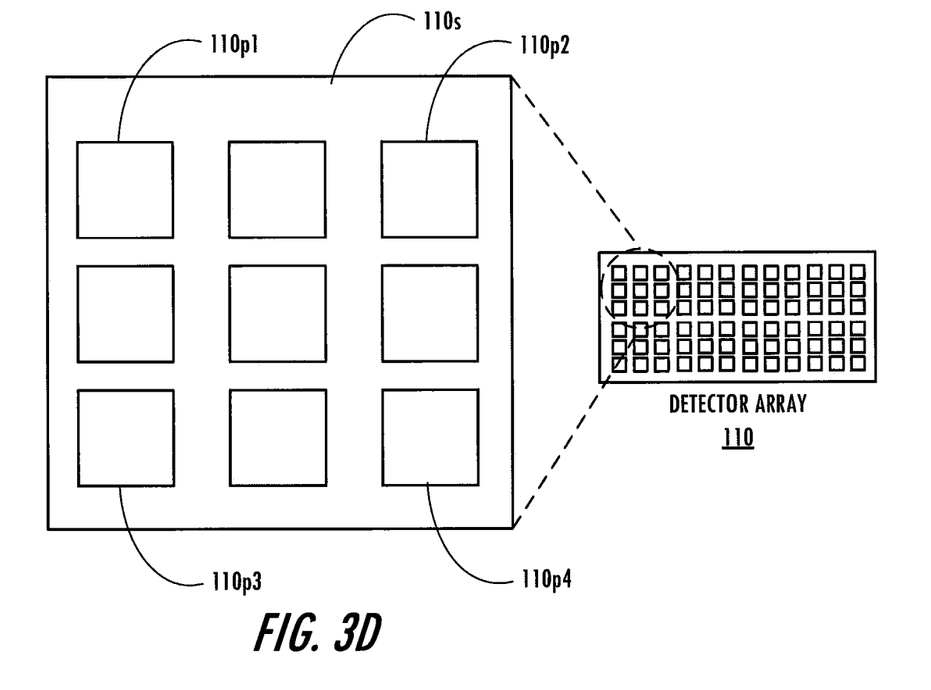
FIG. 3D is a block diagram illustrating spatial averaging of data in phase space in accordance with embodiments of the present disclosure.
Figure 3E:
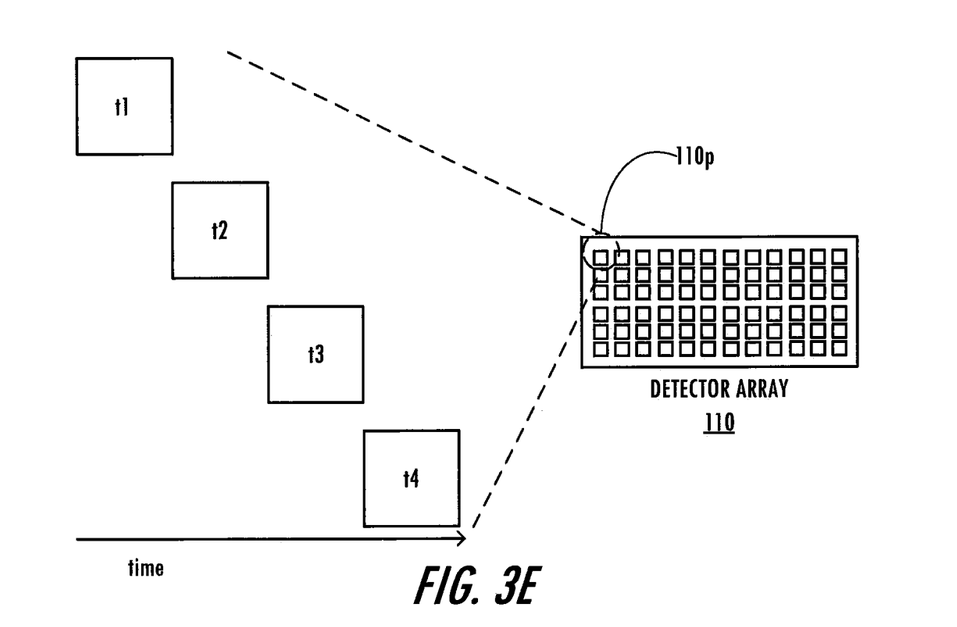
FIG. 3E illustrates an example of temporal averaging of data in phase space in accordance with embodiments of the present disclosure.

In some embodiments, the operations illustrated in FIG. 4 may be performed for phase vectors 301-304 defined by detection signals received from a subset 110s including pixels 110p1-110p4 of the detector array 110 during a same measurement frame (where each pixel 110p may include one or more detectors 110d), so as to perform spatial averaging of the detection signals from pixels 110p at differing spatial positions in the array, as shown in FIG. 3D. For example, pixels that output detection signals that appear to indicate erroneous distance ranges (as compared with those of adjacent pixels) may have their outputs averaged with the adjacent pixels. Additionally or alternatively, the operations illustrated in FIG. 4 may be performed for phase vectors 301-304 defined by detection signals received from the same pixel or pixels 110p of the detector array 110 at different times t1-t4 (e.g., over consecutive measurement frames), so as to perform temporal averaging of the detection signals, as shown in FIG. 3E. Spatial and/or temporal averaging of phase data as described herein may be effective in reducing effects of noise in operations for distance range computation in LIDAR systems.

Figure 5A:
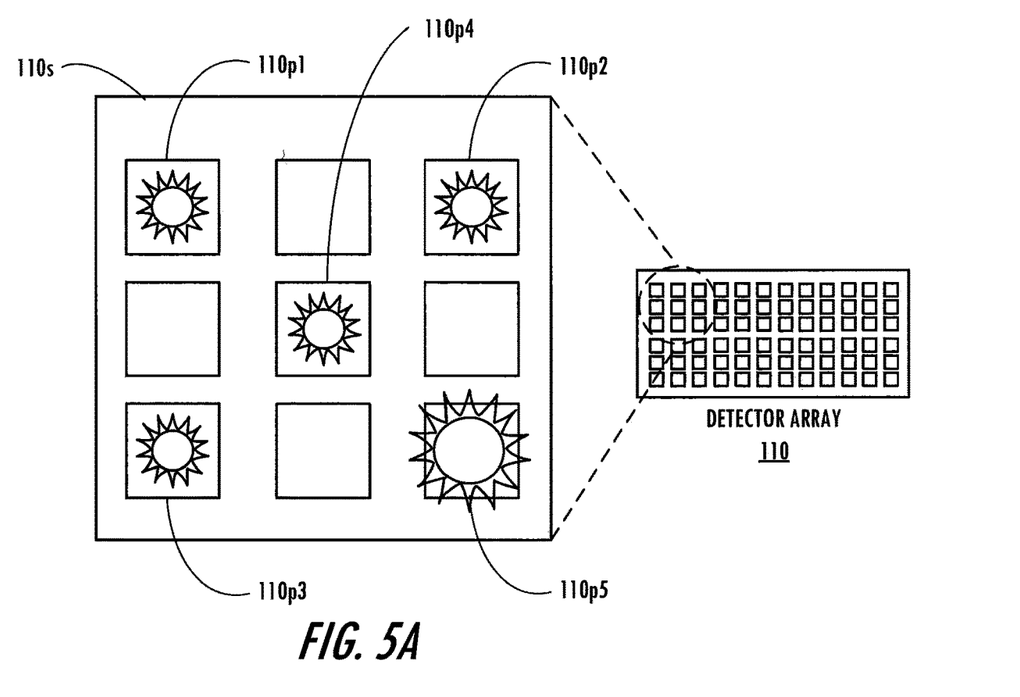
FIG. 5A illustrates per-pixel correction in spatial averaging of data in phase space in accordance with embodiments of the present disclosure.

The detection signals for each modulation frequency may be averaged directly, or with different scaling or weighting or other correction factor applied on a per-pixel basis. FIG. 5A illustrates an example of per-pixel correction in spatial ROI averaging of phase data in accordance with embodiments of the present disclosure. As shown in FIG. 5A, a 3×3 subset 110s of pixels 110p of the detector array 110 may detect echo signals of differing intensities based on differing spatial positions of the pixels 110p in the detector array 110. In the example of FIG. 5A, the respective intensities indicated by detection signals output from pixels 110p1-110p4 of the subset 110s may be comparatively dimmer (visually represented by the smaller starburst patterns) than the intensity of the detection signal output from the corner pixel 110p5 (visually represented by the larger starburst pattern). As the pixels 110p of the subset 110s may generally be directed to a same subregion of the ROI, the differing intensities may indicate the presence of noise in the detection, for example, due to ambient light, glare from a brighter or more reflective target in an adjacent subregion of the field of view, effects of the lens 112, and/or noise that otherwise effects detection based on relative spatial positions or offsets of the pixels 110p. As such, in computing the combined vector 310, the control circuit 105 may more heavily weight the detection signals output from the pixels 110p1-110p4 (or component measurements thereof) indicating the comparatively dimmer intensities, to account for the apparent inaccuracy of the detection signal output from the pixel 110p5.

Figure 5B:
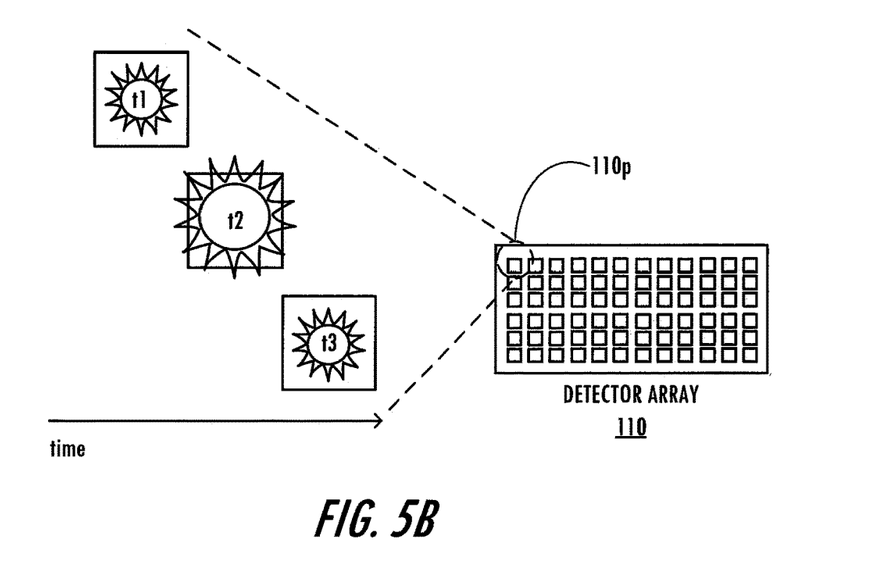
FIG. 5B illustrates per-pixel correction in temporal averaging of data in phase space in accordance with embodiments of the present disclosure.

FIG. 5B illustrates an example of per-pixel correction in temporal ROI averaging of phase data in accordance with embodiments of the present disclosure. As shown in FIG. 5B, one or more pixels 110p of the detector array 110 may detect echo signals of differing intensities at different times t1, t2, and t3, for example, corresponding to consecutive measurement frames. In the example of FIG. 5B, the respective intensities indicated by detection signals output from the pixel 110p may be comparatively dimmer at the measurement frames taken at time t1 and t3 (visually represented by the smaller starburst patterns) than at the intervening measurement frame taken at time t2 visually represented by the larger starburst pattern), which may indicate the presence of noise or other inaccuracy in the detection signal at time t2. As such, in computing the combined vector 310, the control circuit 105 may apply a lesser weighting to the detection signals output from the pixels 110p of the subset 110s (or component measurements thereof) during time t2, to account for the inaccuracy.

In some embodiments the control circuit 105 may be configured to perform per-pixel phase correction of the detection signals for each modulation frequency by calculating the respective phase angles represented by the respective component measurements, and applying phase offsets or corrections to the respective phase angles to provide respective corrected phase angles. For example, using the a tan 2 function, the control circuit 105 may calculate phase angles θ1, θ2, θ3, and θ4 based on the component measurements B1/A1, B2/A2, B3/A3, and B4/A4, respectively, and apply per pixel phase correction to the phase angles θ1, θ2, θ3, and θ4 (e.g. to account for aberrations due to the lens, pixel offsets, etc.). In some embodiments, the per-pixel phase corrections may be determined by performing calibration operations to measure phases of echo signals from object(s) at known distance(s). By comparing the measured results to theoretical results, a phase map of offsets or corrections may be created for the detector array, on a per-pixel basis. The control circuit 105 may convert or transform the respective corrected phase angles into the respective phase vectors 301-304 (preserving original intensity), and may sum the phase vectors 301-304 (or the component measurements thereof) to generate the combined vector 310 and determine the angle of the combined vector 310 as an indication of the average phase for each modulation frequency.

In some embodiments, the distance range of a target may be determined or estimated using a lookup table that correlates pairs or sets of phase shifts (e.g. 0, π/2, π, 3π/2) with sub-ranges of an unambiguous range for the different modulation frequencies, where a pair (or set) of phase shifts includes one phase shift for each of the different modulation frequencies. For example, for a given pair of modulation frequencies, the allowed combinations of phase shift pairs for an unambiguous range corresponding to a greatest common divisor of the pair of frequencies may be determined and correlated to respective sub-ranges of the unambiguous range to provide the lookup table or matrix.

FIGS. 6A and 6B are lookup tables illustrating distance range estimation performed without and with operations for averaging of phase data in accordance with embodiments of the present disclosure, respectively. The different shadings in FIGS. 6A and 6B visually represent domains or distance zones corresponding to respective distance sub-ranges of the unambiguous range. For each distance sub-range, the lookup tables correlate the phase pairs for two modulation frequencies (represented by the x- and y-axes, respectively, where 0, 1, 2, 3 represent phase shifts of 0, π/2, π, 3π/2, respectively). In the examples of FIGS. 6A and 6B, two modulation frequencies of 18 MHz and 21 MHz having a difference of 3 MHz defines the unambiguous range of the system. As mentioned, the unambiguous range UR may be defined as $c/2f_m$, so for a frequency difference $f_m$=3 MHz, UR=$c/2f_m$=$3\times10^8/2(3,000,000)$=50 m. The modulation frequencies may be selected such that they are integer multiples of the frequency defining the unambiguous range. Although shown as a two-dimensional plot for purposes of illustration, it will be understood that the lookup table may be represented as a multi-dimensional matrix that maps sets of phase angles or phase shifts to respective distance subranges.

As shown in FIG. 6B, distance range estimates that are calculated using averaging of phase data in accordance with embodiments of the present disclosure may provide error reduction in phase space as compared with the distance range estimates shown in FIG. 6A. For example, the averaging of phases shown in FIG. 6B results in significant reduction in the distribution of the distance range estimates as compared to FIG. 6A. Integer ambiguity can be seen as a distribution of distance range estimates spanning several different distance zones in FIG. 6A. Averaging of phase data in accordance with embodiments of the present disclosure result in distance range estimate distributions that are closer to center of the respective distance zones, as shown in FIG. 6B, thereby reducing ambiguity in cases where all points now fall in one distance zone. In comparison with FIG. 6A, even distance range estimates that fell on opposite sides of phase space may be pulled to the correct location or distance zone in FIG. 6B, rather than midway between the distance zones.

Figure 7A:
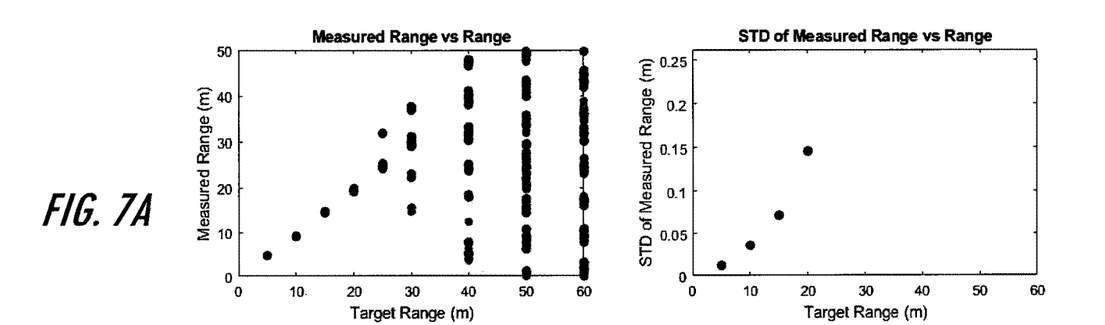
FIGS. 7A, 7B, and 7C are graphs illustrating measured distance ranges and standard deviations in the measured ranges based on the detection signals output from the detector array alone, based on averaging of the distance ranges calculated from the detection signals, and based on averaging in phase space in accordance with embodiments of the present disclosure, respectively.
Figure 7B:
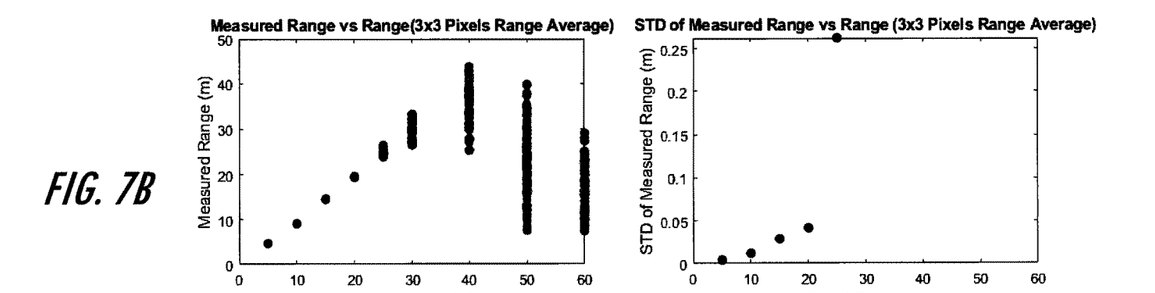
Figure 7C:
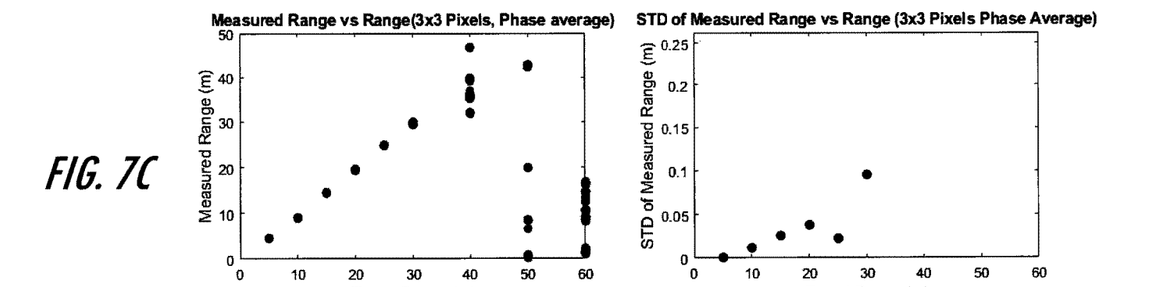

FIGS. 7A, 7B, and 7C are graphs illustrating measured or estimated distance ranges (and standard deviations in the measured distance ranges) vs. actual target ranges as determined from the detection signals output from the detector array alone, determined from averaging of distance ranges, and based on averaging of phase data based on the component measurements of the detection signals in accordance with embodiments of the present disclosure, respectively. In FIGS. 7A, 7B, and 7C, at distances of about 20 meters (m) and below, all three methods provide measured ranges that generally correspond to the actual target ranges. For example, in a lookup table such as those shown in FIGS. 6A and 6B, the phase pairs determined from detection signals at two different measurement frequencies may fall within a single distance sub-range where the actual ranges of the target are about 20 m or less. However, integer ambiguity increases with actual target ranges above about 20 m, as shown by the increasing variations in the measured ranges for 30 m, 40 m, and 50 m.

As shown in FIG. 7C (in comparison with FIGS. 7A and 7B), averaging of the component measurements in phase space provides improvements in reducing integer ambiguity. In particular, distance ranges calculated from the component measurements from the detection signals alone (in FIG. 7A) show increasing integer ambiguity after 20 m. The averaged distance ranges (in FIG. 7B) provide values having lower standard deviation and less peak error than the component measurements; however, noise may still affect range estimates at distances beyond about 20 m, and the average values may drop further at longer distances. The averaged phases using vector addition of component measurements (in FIG. 7C) in accordance with some embodiments of the present disclosure provide distance ranges having relatively low noise out to distances of about 30 m, and noise that is substantially reduced at distances beyond about 30 m (as compared to the averaged ranges of FIG. 7B), with peak error in the distance range calculations of FIG. 7C being lower than in FIGS. 7A and 7B.

Phase averaging using vector addition of component measurements in accordance with some embodiments of the present disclosure can be complemented with additional phase averaging and/or by varying the measurement frequencies. For example, embodiments described herein may be used as an alternative to and/or in conjunction with various error reduction methods, including integrating over longer durations for collecting more photons, averaging across multiple frames, averaging across multiple pixels, and/or reducing distance resolution to reduce ambiguity. While described herein by way of specific examples with reference to two measurement frequencies, it will be understood that embodiments of the present disclosure may utilize fewer or more measurement frequencies for phase averaging using vector addition of component measurements to generate combined vectors as described herein. For example, in some embodiments a single measurement frequency may be used, e.g., for systems with shorter range requirements. In other embodiments, more than two measurement frequencies may be used.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 to Burroughs et al., filed Apr. 12, 2018, with the United States Patent and Trademark Office, the disclosure of which is incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods, systems and/or devices having certain components provided in particular implementations. However, the methods, systems and/or devices may operate effectively in other implementations, may include fewer or additional components than those shown, and variations in the arrangement and type of the components may be made without departing from the scope of the inventive concepts. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. Although some of the diagrams include arrows on communication paths to show a primary direction of communication, it is to be understood that communication may occur in the opposite direction to the depicted arrows. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be further appreciated that the functionality of any or all of the program modules may also be implemented using discrete hardware components, one or more application specific integrated circuits (ASICs), or a programmed digital signal processor or microcontroller. The program code may execute entirely on a single processor and/or across multiple processors, as a stand-alone software package or as part of another software package. The program code may execute entirely on an electronic device or only partly on the electronic device and partly on another device. In the latter scenario, the other device may be connected to the electronic device through a wired and/or wireless network.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of the present invention being set forth in the following claims.

The invention claimed is:

1. A flash LIDAR apparatus, comprising:
   an emitter array comprising emitter pixels configured to emit optical signals and arranged to direct the optical signals over subregions of a field of view, the emitter array further configured to emit first optical signals with a first modulation frequency and second optical signals with a second modulation frequency;
   a detector array comprising detector pixels configured to output detection signals responsive to light incident thereon, the detection signals including first detection signals responsive to the first optical signals and second detection signals responsive to the second optical signals; and
   a circuit configured to perform operations comprising:
   receiving the detection signals output from the detector array, each of the detection signals comprising component measurements defining a respective phase vector;
   generating a first combined vector based on the component measurements of the first detection signals;
   generating a second combined vector based on the component measurements of the second detection signals; and
   identifying a distance range of a target from which the optical signals were reflected based on a first angle of the first combined vector and a second angle of the second combined vector.

2. The LIDAR apparatus of claim 1, wherein the component measurements of each of the first detection signals comprise first and second components defining the respective phase vector, and wherein the first combined vector comprises a sum of the first components and a sum of the second components of the respective phase vectors.

3. The LIDAR apparatus of claim 2, wherein the component measurements of each of the first detection signals are sampled at respective phase offsets corresponding to respective subframes of a measurement frame of operation of the detector array.

4. The LIDAR apparatus of claim 3, wherein the detection signals are output from a plurality of the detector pixels of the detector array during the measurement frame.

5. The LIDAR apparatus of claim 1, wherein the operations further comprise:
   differently scaling the detection signals based on respective intensities thereof prior to generating the first combined vector and the second combined vector.

6. The LIDAR apparatus of claim 1, wherein the operations further comprise:
   applying respective phase corrections to phase data represented by the component measurements prior to generating the first combined vector and the second combined vector.

7. The LIDAR apparatus of claim 3, wherein the detection signals are sequentially output from one of the detector pixels of the detector array during consecutive measurement frames.

8. The LIDAR apparatus of claim 1,
   wherein identifying the distance range of the target from which the optical signals were reflected is based on a correspondence of the first angle of the first combined vector and a second angle of the second combined vector.

9. The LIDAR apparatus of claim 8, wherein the correspondence is indicated by a lookup table that correlates respective phase shift pairs to respective sub-ranges of an unambiguous range for the first and second modulation frequencies,
   wherein the first and second angles correspond to one of the respective phase shift pairs, and wherein the distance range of the target corresponds to one of the respective sub-ranges.

10. The LIDAR apparatus of claim 1, wherein the LIDAR apparatus is configured to be coupled to a vehicle such that the emitter and detector arrays are oriented relative to an intended direction of travel of the vehicle.

11. A method of operating a LIDAR apparatus, the method comprising:
    performing, by circuit of the LIDAR apparatus, operations comprising:
    receiving detection signals output from a detector array responsive to optical signals incident thereon, each of the detection signals comprising component measurements defining a respective phase vector, the detection signals including detection signals responsive to optical signals having a plurality of different modulation frequencies;

generating a plurality of combined vectors, each combined vector based on the component measurements of the detection signals at a respective one of the different modulation frequencies; and identifying a distance range of a target from which the optical signals were reflected based on respective angles of the combined vectors.

12. The method of claim 11, wherein the component measurements of each of the detection signals comprise first and second components defining the respective phase vector, and wherein each of the combined vectors comprises a sum of the first components and a sum of the second components of the respective phase vectors.

13. The method of claim 12, wherein the component measurements of each of the detection signals are sampled at respective phase offsets corresponding to respective sub-frames of a measurement frame of operation of the detector array.

14. The method of claim 13, wherein the detection signals are output from a plurality of detector pixels of the detector array during the measurement frame.

15. The method of claim 11, wherein the operations further comprise:

differently scaling the detection signals based on respective intensities thereof prior to generating the combined vectors.

16. The method of claim 11, wherein the operations further comprise:

applying respective phase corrections to phase data represented by the component measurements prior to generating the combined vectors.

17. The method of claim 11, wherein the detection signals are sequentially output from a same pixel of the detector array during consecutive measurement frames.

18. The method of claim 11, wherein identifying the distance range of the target from which the optical signals were reflected is based on a correspondence of the respective angles of the combined vectors.

19. The method of claim 18, wherein the correspondence is indicated by a lookup table that correlates respective phase shift combinations to respective sub-ranges of an unambiguous range for the plurality of modulation frequencies, wherein the respective angles correspond one of the respective phase shift combinations, and wherein the distance range of the target corresponds to one of the respective sub-ranges.

20. A method of operating a LIDAR apparatus, the method comprising:

performing, by at least one processor, operations comprising:

providing emitter control signals to an emitter array, wherein emitter pixels of the emitter array are configured to emit optical signals at two or more modulation frequencies over subregions of a field of view responsive to the emitter control signals;

providing detector control signals to a detector array, wherein detector pixels of the detector array are configured to detect light incident thereon responsive to the detector control signals;

receiving detection signals output from the detector array responsive to the light incident thereon, the detection signals comprising component measurements sampled at respective phase offsets;

for each of the two or more modulation frequencies, generating a respective combined phase vector comprising a sum of the component measurements of a plurality of the detection signals;

determining respective angles of the respective combined phase vectors; and identifying a distance of a target from which the respective optical signals were reflected based on the respective angles of the respective combined phase vectors.

* * * * *